June 1, 1965   D. N. STEFFANOFF   3,186,753
WIND SILENCER FOR SUN-ROOFS OF PASSENGER VEHICLES
Filed Feb. 24, 1964
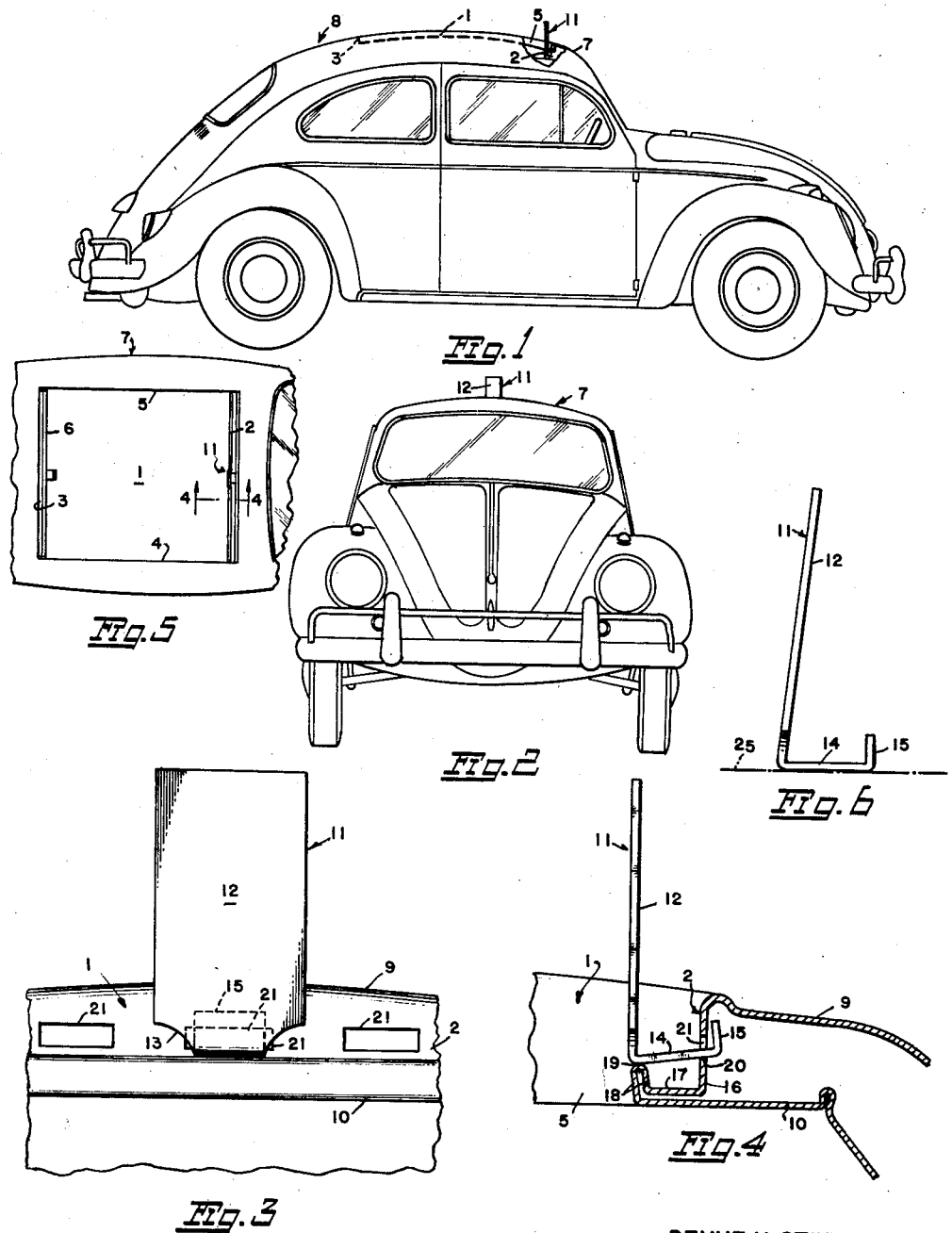
DENUE N. STEFFANOFF
INVENTOR.
BY James L. Givnan
ATT'Y United States Patent Office 3,186,753
Patented June 1, 1965

3,186,753
WIND SILENCER FOR SUN-ROOFS OF PASSENGER VEHICLES
Denue N. Steffanoff, 460 Madison St., Eugene, Oreg.
Filed Feb. 24, 1964, Ser. No. 346,762
5 Claims. (Cl. 296—1)

This invention relates to improvements in modern automobiles which are constantly improved in efficiency and comfort and wherein careful streamlining of the bodies thereof to reduce air resistance is one of the important factors that enable such automobiles to travel economically at high speeds along modern highways.

Certain types of all-metal automobile bodies are provided with a sun roof characterized by an elongated opening in the roof substantially co-extensive with the width thereof and provided with a closure slidably retractable or foldable rearwardly to uncover the opening to effect the pleasures of an "open car," or forwardly to close the opening against undesirable atmospheric conditions.

In modern automobile production plants, mammoth body presses stamp out one-piece tops and steel bodies from large sheets of carbon steel usually about $35/1000$ of an inch in thickness.

The inherent flexibility of the expanse of such steel, especially in the roof, trunk, hood, and other sections of an automobile body, leads to "oil-canning." In other words, localized variable pressures intermittently applied to such vibratile surfaces cause them to pop in and out with the muted sound of thumping or beating a drum, but this has nothing to do with the structural integrity of the car. Thus those surfaces of that portion of the roof which slopes downwardly and rearwardly from the rear edge of the sun roof opening, when uncovered while the automobile is in forward motion, reacts in some respects as an airfoil to an airstream flowing over and under it, in that varying degrees of lifting vacuum created by the varying velocities of air flow over the roof and the variable upward pressures from below set up a sonorous, tremulous motion resulting in the propagation of vibratory noises which are disturbing to the occupants of the automobile.

Accordingly, it is one of the principal objects of this invention to provide simple and efficient means for effectively breaking up or "burbling" the airstream by dividing its rearward flow over that portion of the roof to thereby dampen if not entirely eliminate the objectionable noises emanating from this aerodynamic phenomenon.

The invention broadly comprehends the provision of an obstruction in the form of a vertically disposed "baffle" attached to the forward edge of the sun roof opening and adjustable and lockable at selected positions therealong.

The foregoing and other objects and advantages which will become subsequently apparent reside in the details of construction and operation as more fully hereinafter described and claimed, reference being had to the accompanying drawing forming a part hereof and in which:

FIGURE 1 is a side elevational view of a passenger automobile with a fragment of its top broken away for convenience in illustrating the sun roof opening therein and the installation at the forward end thereof of a baffle made in accordance with my invention.

FIGURE 2 is a front elevational view of FIGURE 1.

FIGURE 3 is a rear elevational detail view of the installed baffle on an enlarged scale.

FIGURE 4 is a sectional side elevational view taken approximately along the line 4—4 of FIGURE 3.

FIGURE 5 is a fragmentary plan view of the sun roof with its closure in an open position, and FIGURE 6 is a side elevational view of the baffle standing alone on the ground or roadway to serve as a warning signal.

With continuing reference to the drawing wherein like reference characters designate like parts and particularly FIGURES 1 and 5 thereof, reference numeral 1 indicates the sun roof opening defined by transverse front and rear edges 2-3, side edges 4-5 and provided with a closure 6 which may be a slidable panel or a rearwardly rollable or foldable sheet of fabric. The car roof indicated generally at 7 is exemplary of certain streamlined types which slope downwardly and rearwardly from the central portion as at 8.

Some such roofs are of single thickness and others are of vertically spaced apart top and bottom double wall construction, as indicated at 9 and 10 in FIGURE 4, but in either case the rearward expanse of metal sloping downwardly from the rear edge 3 of the sun roof opening, being characteristic of the top surface of an airfoil, reacts to the flow thereover in a manner as above pointed out.

The airstream diverting baffle, as best illustrated in FIGURES 3 and 4 and indicated generally at 11, comprises a normally vertically disposed panel 12 reduced in width as at 13 at its bottom end and thereat integrated with a slightly upwardly inclined base 14 bent or formed into an upwardly extending hook member 15 at its outer end.

The front edge 2 of the roof opening 1, as best shown in FIGURE 4, is defined by a vertical web 16 interconnecting top and bottom walls 9 and 10 of the roof structure, and a rearwardly extending integral horizontal portion 17 bent upwardly and downwardly as at 18 to form a rearwardly spaced ridge 19 of less height than the bottom edge 20 of the selected opening 21 in the web 16, then forwardly to continue on as the bottom or inner wall 10 of the roof structure.

When installed, the panel 12 with wind forces impinging thereagainst, serves a lever arm, the ridge 19 as a fulcrum and the base 14 as a load arm in maintaining the hook member 15 in hooked engagement with the web 16. In the absence of wind pressure the baffle by its own weight will still be held by gravitational repose in the position shown.

The baffle 11 may be made of metal and advantageously produced by a stamping and forming die, or made of sheet or molded plastic and if desired provided with a colored or reflective surface coating for warning purposes when placed on a roadway 25, standing alone as in FIGURE 6, ahead of or behind a stalled car or for any other emergency.

The baffle 11 is shown centrally located relative to the front edge 2 of sun roof opening but it will be readily understood that it can be selectively positioned in engagement with any of the openings 21 as deemed necessary or desirable in accordance with the prevailing direction of air flow.

While I have shown a particular form of embodiment of my invention, I am aware that many minor changes therein will readily suggest themselves to others skilled in the art without departing from the spirit and scope of the invention. Having thus described my invention, what I claim as new and desire to protect by Letters Patent is:

1. A vehicle top having a sun roof opening defined by front and rear transverse edges and two side edges,
said roof at the front edge of said opening being of vertically spaced apart double wall construction,
said front edge of the roof opening defined in cross section by a vertical web integral with said double walls and having at least one horizontally disposed opening therein backed by a rearwardly spaced ridge of less height than said web opening,
a normally vertically disposed panel integrated with a forwardly extending base terminating in an upwardly bent hook member substantially parallel with said panel and in engagement with said web through said opening therein with the opposite end of the base member resting upon and supported by said ridge.

2. In a vehicle having a sun roof opening defined by front and rear transverse edges and two side edges,
   said roof at the front edge of said opening being of vertically spaced apart double wall construction,
   said front edge of the roof opening defined in cross section by a vertical web integral with said double walls and having at least one horizontally disposed opening therein backed by a rearwardly spaced ridge of less height than said web opening,
   the improvement comprising a normally vertically disposed panel integrated with a forwardly extending base terminating in an upwardly bent hook member substantially parallel with said panel and in engagement with said web through said opening therein with the opposite end of the base member resting upon and supported by said ridge.

3. An airstream baffle as claimed in claim 2, wherein said base and upwardly bent hook member are of less width than that of said panel.

4. A vehicle top having a sun roof opening defined by front and rear transverse edges and two side edges,
   said roof at the front edge of said opening being of vertically spaced apart double wall construction,
   said front edge of the roof opening defined in cross section by a vertical web integral with said double walls and having horizontally spaced apart openings therein backed by a rearwardly spaced horizontal ridge of less height than the bottom edge of said opening,
   means for dividing laterally a rearward airstream over said sun roof opening,
   said means comprising a flat panel normally vertically disposed with its bottom end resting upon said ridge and integral with a substantially horizontal forwardly extending base bent upwardly at its forward end into a hook member and thereat in hooked engagement with one of said web openings, whereby said panel when so positioned and subjected to the wind forces of an airstream in any rearward direction with its said bottom end resting upon said ridge becomes effective as a lever arm about a fulcrum established by said ridge in biasing the load arm characteristics of said base in maintaining said hooked end thereof in firm engagement with said web.

5. In a vehicle top having a sun roof opening defined by front and rear transverse edges and two side edges,
   said roof at the front edge of said opening being of vertically spaced apart double wall construction,
   said front edge of the roof opening defined in cross section by a vertical web integral with said double walls and having horizontally spaced apart openings therein backed by a rearwardly spaced horizontal ridge of less height than the bottom edge of said opening;
   the improvement comprising means adapted to divide laterally a rearward airstream over said sun roof opening,
   said means comprising a flat panel normally vertically disposed with its bottom end resting upon said ridge and integral with a substantially horizontal forwardly extending base bent upwardly at its forward end into a hook member and thereat in hooked engagement with one of said web openings, whereby said panel when so positioned and subjected to the wind forces of an airstream in any rearward direction with its said bottom end resting upon said ridge becomes effective as a lever arm about a fulcrum established by said ridge in biasing the load arm characteristics of said base in maintaining said hooked end thereof in firm engagement with said web.

References Cited by the Examiner
UNITED STATES PATENTS
2,243,029   3/41   Cupit _____ 296—91

FOREIGN PATENTS
747,781   3/56   Great Britain.

MILTON BUCHLER, *Primary Examiner.*
A. HARRY LEVY, *Examiner.*